Patented Sept. 19, 1950

2,522,858

UNITED STATES PATENT OFFICE 2,522,858

HYDROGENATION OF STREPTOMYCIN

Rudolph A. Carboni, Yonkers, N. Y., and Peter P. Regna, West New York, N. J., assignors to Chas. Pfizer & Co., Inc., New York, N. Y., a corporation of New Jersey No Drawing. Application March 29, 1949, Serial No. 84,263

3 Claims. (Cl. 260—210)

This invention relates to an improved process for preparing dihydrostreptomycin, and more particularly, to an improved process for catalytically hydrogenating streptomycin to dihydrostreptomycin.

It is known that streptomycin can be hydrogenated to dihydrostreptomycin, an extremely effective antibiotic, in the presence of noble metal catalysts, such as platinum and palladium. These catalysts are expensive and must be handled and recovered with great care in order to avoid costly losses of the catalytic materials. The use of base metals, such as nickel, for this purpose has been avoided because it was believed they would lead to destructive hydrogenation, as pointed out by Hooper et al. in J. A. C. S. 68, 2120 (Oct. 1946).

An object of this invention is to provide an economical catalytic process for rapidly hydrogenating streptomycin employing a base metal catalyst, while at the same time preventing destructive hydrogenation. A further object is to provide a rapid and efficient catalytic process for hydrogenating streptomycin to obtain dihydrostreptomycin using a nickel catalyst. Further objects will appear hereinafter.

It has now been found that water-soluble salts of streptomycin can be hydrogenated to the corresponding salts of dihydrostreptomycin by subjecting their solutions to catalytic hydrogenation at superatmospheric pressures in the presence of a nickel catalyst, provided the temperature of the reaction is maintained between 50° and 105° C., preferably about 75° C. To avoid destructive hydrogenation and at the same time carry out the reaction at a practical rate, the temperature at which the reaction is conducted is the all-important factor, and it must be maintained within carefully defined limits.

The streptomycin is hydrogenated in the form of a water-soluble salt, for example, the hydrochloride, hydrobromide, sulfate, phosphate or the calcium chloride double salt of the hydrochloride.

Hydrogenation is preferably carried out in aqueous solution, but other water-miscible solvents in which streptomycin salts are soluble may be employed, for example, methanol, ethanol and the like. From about 10 to about 25% of the streptomycin salt may be dissolved in the solvent, and from about 1.0 to about 4% of finely divided catalyst may be suspended therein, all figures being by weight and based on the weight of the solution. The nickel catalyst may be used as such or may be supported on kieselguhr or related material. The preferred form of nickel catalyst is that known as Raney nickel.

The hydrogenation is carried out within the temperature range of 50–105° C. with a freshly activated aluminum-nickel alloy (Raney catalyst), since below 50° C. the reaction proceeds at an impracticably slow rate, whereas above 105° C. decomposition and other objectionable side reactions become appreciable.

Hydrogenation is preferably carried out between 500 lbs. and 2000 lbs. of hydrogen pressure per square inch, in a suitable pressure vessel, adapted for hydrogenation reactions. Pressure, however, is not critical. Preferably pressures of 700–1000 lbs. per square inch are employed since generally the reaction proceeds most expeditiously within these limits.

The time of the reaction will depend somewhat on the other factors, but as a general rule is within the range of about 2 hours to 7 hours. This is sufficient to obtain a substantial yield of the desired dihydrostreptomycin salt.

The streptomycin salt which is converted to the corresponding dihydrostreptomycin salt by this process can either be in pure form or in the form of a crude concentrate as obtained in the streptomycin manufacturing process prior to purification steps.

The invention is further illustrated by the following examples:

Example I

One hundred gms. of streptomycin sulfate was dissolved in 350 ml. of water to give a solution of about 200,000 $\gamma$/ml. The solution was placed in a stainless steel autoclave along with 15 gms. of Raney nickel catalyst. The temperature was maintained between 70° and 80° C., for the most part in the neighborhood of 75° C., and the pressure between 700 and 1000 lbs. per square inch of hydrogen with agitation for a period of about six and a half hours. At the end of the hydrogenation period the maltol test was negative indicating the absorption of one mole of hydrogen and the disappearance of the aldehyde group.

The hydrogenated mixture was then filtered to remove the catalyst, and the filtrate was freeze-dried to obtain dihydrostreptomycin sulfate as a white solid.

In another test hydrogenation carried out as indicated in this example, the temperature was allowed to go to 120° C. with the result that the potency of the dihydrostreptomycin dropped one third during hydrogenation, thereby demonstrating the importance of controlling the temperature within the critical range of 50-105° C.

Example II

A concentrated solution of streptomycin in dilute hydrochloric acid which was eluted from a cation-exchange resin on which the streptomycin had been adsorbed was subjected to hydrogenation as in Example I. Dihydrostreptomycin hydrochloride of excellent purity was obtained in good yield.

This invention provides an economical and efficient process for converting water-soluble salts of streptomycin to the corresponding dihydrostreptomycin salt of lowered toxicity and improved potency as determined by biological assay. Previous methods for the production of dihydrostreptomycin have been expensive and time-consuming. Despite the recognized instability of streptomycin, it is now possible to convert it to its important dihydro derivative by a speedy and efficient process.

As many apparently widely different embodiments of this invention may be made without departing from the spirit and scope hereof, it is to be understood that the invention is not limited to the specific embodiments hereof, except as defined in the appended claims.

We claim:

1. A process for converting streptomycin to dihydrostreptomycin while avoiding destructive hydrogenation which comprises subjecting to superatmospheric hydrogen pressures a solution of a streptomycin salt throughout which is suspended a Raney nickel catalyst, the temperature of said solution being maintained within the range of about 50° C. to about 105° C., and terminating said reaction when approximately one molecule of hydrogen has been reacted per molecule of streptomycin.

2. A process which comprises catalytically hydrogenating an aqueous solution of a water-soluble streptomycin salt in the presence of a Raney nickel catalyst at a temperature between 50° C. and 105° C. and a hydrogen pressure between 500 and 2000 lbs. per square inch until substantially one molecule of hydrogen has been reacted per molecule of streptomycin.

3. Process of claim 2 in which the catalyst is present from 1 to 4% by weight of the aqueous solution.

RUDOLPH A. CARBONI.
PETER P. REGNA.

REFERENCES CITED

The following references are of record in the file of this patent:

Peck et al.: J. A. C. S., v. 68 (1946), pp. 1390-1391, 2 pages.

Hooper et al.: J. A. C. S., v. 68 (1946), pp. 2120-2121, 2 pages.